Inventor
AARON DAVID WEINBERGER

ATTYS.

United States Patent Office 3,527,999
Patented Sept. 8, 1970

---

3,527,999
SWITCHING TYPE VOLTAGE REGULATOR CONTROLLED BY INTEGRATING CIRCUIT
Aaron David Weinberger, Chicago, Ill., assignor to Motorola, Inc., Franklin Park, Ill., a corporation of Illinois
Filed Mar. 1, 1968, Ser. No. 709,653
Int. Cl. G05f 1/56
U.S. Cl. 323—22                    7 Claims

ABSTRACT OF THE DISCLOSURE

A voltage regulator circuit including a switch which periodically interrupts the current from a power supply in response to control signals applied thereto. A filter circuit alternately stores and delivers energy to provide an output DC potential having a magnitude which is dependent upon the ratio of the on to the off time of the switch. An intergrating circuit samples the switched voltage and operates a Schmitt trigger circuit to control the on and off time of the switch. No extrinsic reference device is used in this circuit. When it is desired to use the regulated output potential also to operate the Schmitt trigger circuit of the voltage regulator, a starting circuit is provided to initiate operation of the switch for a period of time sufficient to develop a voltage at the output of the regulator which, in turn, will disable the starting circuit during the normal period of voltage regulation.

BACKGROUND OF THE INVENTION

Voltage regulators of the switching type have been developed, however they have shortcomings which limit their usefulness. Such devices have required extrinsic voltage reference devices, such as Zener diodes or voltage regulator tubes, in order to develop the desired output voltage. Such reference devices are costly and subject the circuit to limitations. One limitation is the lower limit at which the circuit will operate at an input voltage. Another limitation is the voltage difference between the input and the regulated output voltages which must be a minimum value. For these reasons, voltage regulating circuits have presented problems which require extra circuitry and/or power supplies to overcome.

SUMMARY OF THE INVENTION

It is, therefore, an object of this invention to provide an improved voltage regulator circuit which requires no extrinsic reference device.

Another object of this invention is to provide an improved voltage regulator circuit which can develop a very low regulated output voltage.

Another object of this invention is to provide an improved voltage regulator circuit requiring only a single low level power supply.

Another object of this invention is to provide an improved voltage regulator circuit in which the voltage difference between the power supply voltage and the regulated output voltage can be made very small.

In practicing this invention a switch is provided which alternately connects and disconnects the power supply from an output terminal. A filter circuit is coupled in series with the switch and the output terminal to store energy during the on periods of the switch and deliver energy to the output terminal during the off periods of the switch to thereby provide a relatively constant DC potential at the output terminal. A control means, which may be in the form of a Schmitt trigger circuit, is used to alternately turn the switch on and off. The control means is controlled by an integrating circuit which samples the output potential from the switch and provides the control signals to turn the control means on and off as required. Circuits utilizing the features of this invention have developed output voltages as low as 1.75 volts and have developed output voltages within ½ volt of the input voltage.

Figure 1:
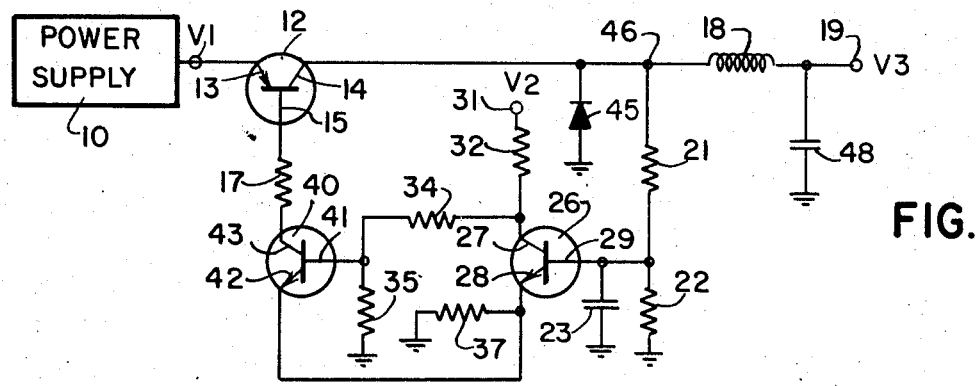
Figure 4:
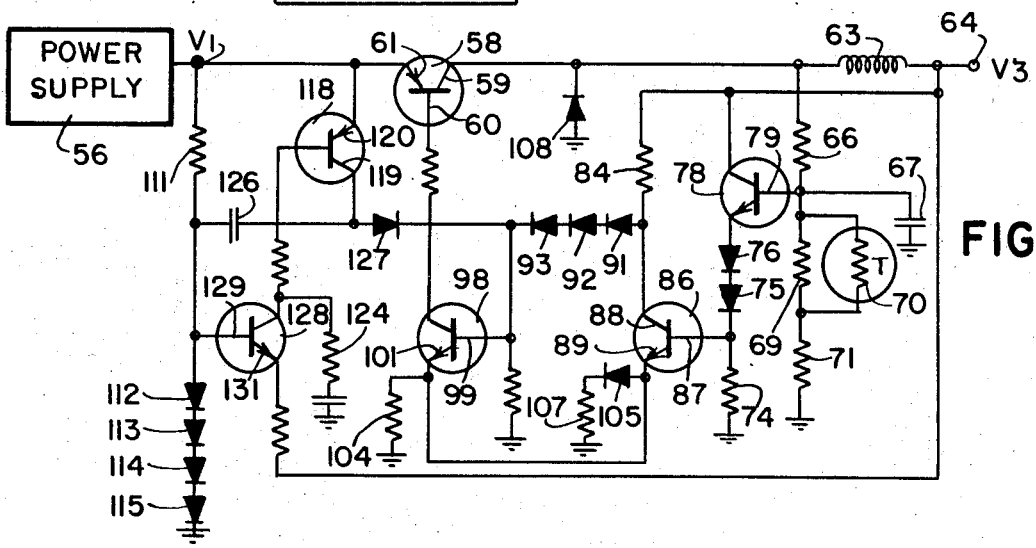
Figure 2:
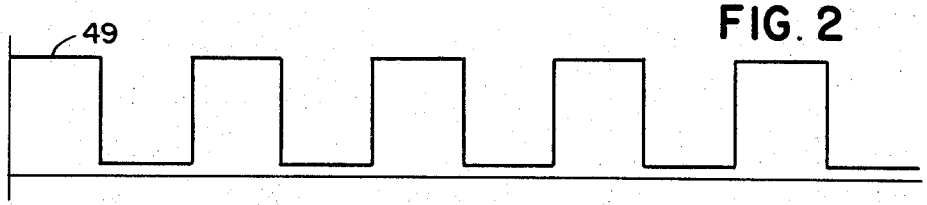
Figure 3:
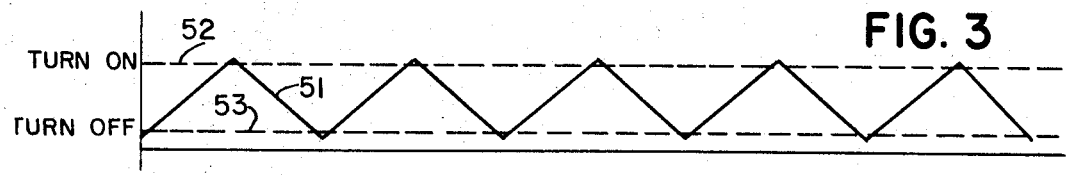

The invention is illustrated in the drawings of which:
FIG. 1 is a schematic of a circuit incorporating the features of this invention;
FIG. 2 is a curve showing the potential at the output of the switch;
FIG. 3 is a curve showing the integrated potential applied to the control means; and
FIG. 4 is a schematic of another embodiment of the invention.

DESCRIPTION OF THE INVENTION

Referring to FIG. 1 a power supply 10 provides an output potential $V_1$ which is coupled to output terminal 19 through emitter 13 and collector 14 of switching transistor 12 and through inductance 18. The output potential from switching transistor 12 appears at point 46 and is sampled by a voltage divider integrating circuit consisting of resistors 21 and 22 and capacitor 23. Transistors 26 and 40 form a Schmitt trigger circuit which is responsive to the potential applied to base 29 of transistor 26 to alternately switch transistors 26 and 40 to conduction and non-conduction. In this circuit only one of the two transistors, 26 and 40, is conducting at one time.

With transistor 40 in the conducting state current flows through emitter 13 and base 15 of transistor 12, resistor 17, collector 43 and emitter 42 of transistor 40 and resistor 37 to ground. This current flows through emitter 13 and base 15 of transistor 12 biases transistor 12 to conduction. With transistor 40 in the non-conducting state there is no path for current to flow from emitter 13 to base 15 and transistor 12 is biased to non-conduction.

Referring to FIG. 2, the output potential appearing at point 46 of FIG. 1 is shown as curve 49. This potential is in the form of a rectangular wave with the output varying according to whether switching transistor 12 is conducting or non-conducting. The potential appearing at point 46 is coupled to the integrating circuit of resistor 21 and capacitor 23 and the potential applied to base 29 of transistor 26 is shown in FIG. 3 as curve 51.

With transistor 26 in a non-conducting state, transistor 40 is in a conducting state and transistor 12 is biased to conduction. With transistor 12 biased to conduction the output potential at point 46 is a maximum and the integrated potential appearing on base 29 of transistor 26 rises according to the time constant of the integrating circuit and the potential of the power supply 10. When the potential on base 29 of transistor 26 reaches the level shown by curve 52 of FIG. 3 transistor 26 is biased to conduction and current flows from terminal 31 through resistor 32, collector 27, emitter 28 and resistor 37. This reduces the potential appearing on collector 27 and since this potential is coupled to base 41 of transistor 40 by resistors 34 and 35, the potential at base 41 of transistor 40 is also reduced, reducing the conduction of transistor 40. As both emitters 42 and 28 are coupled to resistor 37 the feedback action thus produced rapidly turns on transistor 26 and turns off transistor 40. With transistor 40 biased to non-conduction transistor 12 is also biased to non-conduction the potential at point 46 falls to a low level close to ground. The potential at base 29 also falls at a rate which is determined by the time constant of the integrating circuit. Thus the on time of transistor 12 is determined by the time constant of the integrating circuit and the magnitude of the supply potential $V_1$ while the off time of transistor 12 is determined by the time constant of the integrating circuit. The off time remains relatively constant while the on time varies to provide the desired output voltage $V_3$.

When the potential at base 29 of transistor 26 falls to the level 53 shown in FIG. 3, transistor 26 is biased to reduce conduction and the feedback action of the circuit rapidly switches transistors 26 and 40 so that transistor 40 is conducting, transistor 26 is non-conducting and transistor 12 is again biased to conduction.

The output potential appearing at point 46 is filtered in the filter consisting of inductance 18 and capacitance 48. The filter circuit acts to store energy during the on time of transistor 12 and to deliver energy to the output terminal 19 during the on time of transistor 12. Diode 45 acts as a switch which provides a return path for the filter circuit during the period that transistor 12 is biased to non-conduction.

Terminal 31 receives a supply voltage $V_2$ which may be any suitable, relatively constant potential. The potential supplied to $V_2$ may be the supply voltage potential, if this voltage is relatively constant, or it may be the output voltage $V_3$. A separate $V_2$ voltage may be provided if this is desirable, however, it is not necessary to provide a second supply.

Referring to FIG. 4 there is shown a second embodiment of this invention in which the collector terminal 88 of transistor 86 of the Schmitt trigger circuit is coupled through resistor 84 to the output terminal 64 and thus the Schmitt trigger uses the regulated output voltage as its supply. This circuit operates in a manner similar to the circuit of FIG. 1 and the voltage from power supply 56, supplied to terminal 64 through switching transistor 58 and inductance 63 is periodically interrupted.

Transistors 86 and 98 form a Schmitt trigger circuit. The common emitter resistor 104 has diode 105 and resistor 107 coupled in parallel to prevent the potential on emitters 89 and 101 from rising above a desired value. Diodes 91, 92 and 93 provide temperature compensation for the Schmitt trigger circuit.

The integrating circuit is formed by resistor 66 and capacitor 67 coupled to base 79 of transistor 78. Resistors 69 and 71 and thermistor 70 provide the remaining required temperature compensation for the circuit. Transistor 78, diodes 75 and 76 and resistor 74 form an emitter follower circuit which couples the output of the integrating circuit to base 87 of transistor 86. Inductance 63 provides filtering for the regulator and diode 108 acts as a switch which provides a return path for current flowing through inductance 63 with transistor 58 biased to non-conduction.

In the circuit of FIG. 4 the Schmitt trigger circuit receives its power supply from the output of the voltage regulator circuit. As transistor 98 is initially biased to non-conduction, transistor 58 is also biased to non-conduction and there is no voltage at terminal 64. Thus a starting circuit must be provided to turn on transistor 58 and start the voltage regulating action. The starting circuit must have only a single DC stable state and this must be an off state so that during the normal operation of the voltage regulator the starting circuit will not affect the regulation.

A starting circuit having these features is shown in FIG. 4 and includes transistors 118 and 128. The supply voltage from power supply 56 provides a positive potential on base 129 of transistor 128. The magnitude of the potential on base 129 is determined by diodes 112, 113, 114 and 115 with the number of diodes being determined by the requirements of the circuit. Emitter 131 is at ground potential and therefore transistor 128 is biased to conduction by the positive potential on base 129. Resistor 111 is of a high value so that the conduction of transistor 128 is limited.

With transistor 128 biased to conduction transistor 118 is biased to conduction and current flows from emitter 120 to collector 119 increasing the potential on collector 119. This increase in voltage at collector 119 is fed back to base 129 of transistor 128 through capacitor 126 biasing transistor 128 to increase its conduction. The feedback action continues until both transistors 118 and 128 are biased fully to conduction. Capacitor 126 then discharges, reducing the potential on base 129. The reduction in the potential on base 129 acts to turn off transistor 128 reducing the current flow through transistor 118 and lowering the potential on collector 119. The decrease in voltage on collector 119 is coupled back through capacitor 126 and acts in a regenerative manner to turn off transistors 128 and 118. This oscillating action continues until the regulator circuit is in full operation.

With transistor 118 biased to conduction the potential on collector 119, which is very nearly equal to the supply potential of power supply 56, is applied through diode 127 to base 99 of transistor 98. Transistor 98 is biased to conduction providing a bias current for transistor 58 to turn on transistor 58. With transistor 58 biased to conduction the potential at terminal 64 increases in the manner previously described. Each time the transistor 118 is biased to conduction the potential at terminal 64 increases to a higher value until the potential at terminal 64 is sufficient to cause normal operation of the regulator circuit. At this point the potential at terminal 64 which is coupled back to emitter 131 of transistor 128, acts to bias the transistor to non-conduction. Transistors 128 and 118 remain biased in the non-conducting state as long as the voltage regulator is in operation and have no further effect on the circuit.

I claim:
1. A voltage regulator including in combination, first switching means having a conductive state and a non-conductive state, said first switching means further having a first terminal adapted to receive an input potential, a second terminal and a control terminal, a voltage regulator output terminal, filter means coupled between the said second terminal and the second output terminal, switch control means having a first and a second states coupled to said first control means, said first switching means being responsive to said switch control means in said first state to assume said conductive state and to said switch control means in said second state to assume said non-conductive state, integration means coupled between said second terminal and said switch control means, said integration means acting to integrate said potential at said second terminal and apply said integrated potential to said switch control means for causing said switch control means to shift between said first and second states, said integrated circuit means includes first and second resistance means coupled between said second terminal and a common circuit potential, capacitor means coupled between the junction of first and second resistance means and said common circuit potential, said switch control means being coupled to said junction of said first and second resistance means, and second switching means coupled to said filter means for providing a path for current in said filter means with said first switching means in said non-conductive state.

2. The voltage regulator of claim 1 wherein, said switch control means includes first and second transistors each having emitter, base and collector electrodes, said first and second transistors further having common emitter resistance and feedback circuit means coupled between the collector of said first transistor and the base of said second transistor, said first and second transistors, said feedback circuit means and said common emitter resistance forming a Schmitt trigger circuit, said base electrode of said first transistor means being coupled to said junction of said first and second resistance means.

3. The voltage regulator of claim 2 wherein, said first switch means includes a third transistor having a first electrode adapted to receive said input potential and a second electrode coupled to said filter means, said second switching means and said integration means, and a control electrode coupled to said collector electrode of said second transistor.

4. The voltage regulator of claim 3 wherein, said filter means includes inductance means coupled between said second electrode and said output terminal.

5. The voltage regulator of claim 4 wherein said second switching means includes a diode coupled between said inductance means and said common circuit potential.

6. A voltage regulator including in combination, first switching means having a conductive state and non-conductive state, said first switching means having a first terminal adapted to receive an input potential, a second terminal and a control terminal, a voltage regulator output terminal, filter means coupled between said second terminal and said output terminal, switch control means having first and second states coupled to said control terminal, said first switching means being responsive to said switching control means in said first state to assume said conductive state and to said switch control means in said second state to assume said non-conductive state, said switch control means including first circuit means coupled to said output terminal for receiving a supply potential therefrom for operation of said switch control means, integration means coupled between said second terminal and said switch control means, said integration means acting to integrate the potential at said second terminal to apply said integrated potential to said switch control means for causing said switch control means to shift between said first and second states, second switching means coupled to said filter means for providing a path for current in said filter means with said first switching means in said non-conducting state, and starting circuit means adapted to receive said input potential and coupled to said output terminal and said switch control means, said starting circuit means having a single DC stable state wherein such starting circuit means is in an off condition, said starting circuit means acting intermittently to couple said input potential to said switch control means with the potential of said output terminal below the predetermined magnitude and further being responsive to said potential at said output terminal above said predetermined magnitude to be biased to a stable off condition.

7. The voltage regulator of claim 6 wherein, said starting circuit means includes a first transistor having an emitter electrode adapted to receive said input potential, a collector electrode coupled to said switch control means and a base electrode, a second transistor having a collector electrode coupled to said base electrode of said first transistor, an emitter electrode coupled to said output terminal and a base electrode, capacitance means coupled between said collector electrode of said first transistor and said base electrode of said second transistor, and second circuit means adapted to receive said input potential coupled to said base electrode of said second transistor for applying a bias current thereto.

References Cited
UNITED STATES PATENTS 3,437,912   4/1969   Morris  ---------- 323—38 X J D MILLER, Primary Examiner A. D. PELLINEN, Assistant Examiner U.S. Cl. X.R.

323—38, 39